(12) United States Patent
Wang (10) Patent No.: US 12,435,365 B2
(45) Date of Patent: Oct. 7, 2025

(54) LUMINESCENT LANTHANIDE(III) CHELATES

(71) Applicant: Uniogen Oy, Turku (FI)

(72) Inventor: Qi Wang, Kaarina (FI)

(73) Assignee: UNIOGEN OY, Turku (FI)

( * ) Notice: Subject to any disclaimer, the term of this patent is extended or adjusted under 35 U.S.C. 154(b) by 791 days.

(21) Appl. No.: 17/784,035

(22) PCT Filed: Nov. 3, 2020

(86) PCT No.: PCT/FI2020/050723
§ 371 (c)(1),
(2) Date: Jun. 9, 2022

(87) PCT Pub. No.: WO2021/116528
PCT Pub. Date: Jun. 17, 2021

(65) Prior Publication Data
US 2023/0025102 A1  Jan. 26, 2023

(30) Foreign Application Priority Data
Dec. 9, 2019 (FI) .................................. 20196064

(51) Int. Cl.
C07F 5/00 (2006.01)
C12Q 1/6844 (2018.01)
G01N 33/58 (2006.01)

(52) U.S. Cl.
CPC ............ *C12Q 1/6844* (2013.01); *C07F 5/003* (2013.01); *G01N 33/582* (2013.01)

(58) Field of Classification Search
None
See application file for complete search history.

(56) References Cited

U.S. PATENT DOCUMENTS

| | | | |
|---|---|---|---|
| 2013/0183771 A1 | 7/2013 | Meltola | |
| 2016/0031910 A1 | 2/2016 | Maury | |
| 2017/0089913 A1 | 3/2017 | Takalo | |
| 2021/0140970 A1 | 5/2021 | Takalo | |

FOREIGN PATENT DOCUMENTS

| | | |
|---|---|---|
| CN | 103890137 A | 6/2014 |
| CN | 104125997 A | 10/2014 |
| CN | 109313198 A | 2/2019 |
| EP | 1 447 666 | 8/2004 |
| JP | 2014529599 A | 11/2014 |
| JP | 2017520516 A | 7/2017 |
| WO | 2006/072668 | 7/2006 |
| WO | 2010/109065 | 9/2010 |
| WO | 2013026790 A9 | 5/2013 |
| WO | 2014/044916 | 3/2014 |
| WO | 2014/147288 | 9/2014 |
| WO | 2015/165826 | 11/2015 |
| WO | 2016/066641 | 5/2016 |

OTHER PUBLICATIONS

Office Action, issued in Chinese Patent Application No. 202080082921.0 dated Jun. 18, 2024.
Office Action, issued in Japanese Patent Application No. 2022-560413 dated Jul. 30, 2024.
K. Blomberg, et al., "Time-resolved fluorometric assay for natural killer activity using target cells labelled with a fluorescence enhancing liquid", Journal of Immunological Methods, vol. 193, accepted Mar. 19, 1996, pp. 199-206 (8 pages).
Harri Hakala, et al., "Synthesis and properties of nanospheres copolymerized with luminescent europium(III) chelates", Organic & Biomolecular Chemistry, vol. 4, first published Mar. 1, 2006, pp. 1383-1386 (4 pages).
Jari Hovinen, et al., "Bioconjugation with Stable Luminescent Lanthanide(III) Chelates Comprising Pyridine Subunits", Bioconjugate Chemistry, vol. 20, No. 3, Mar. 18, 2009, pp. 404-421 (18 pages).
Jari Hovinen, et al., "Synthesis of azamacrocycles via a Mitsunobu reaction", Tetrahedron Letters, vol. 46, available online May 5, 2005, pp. 4387-4389 (3 pages).
Susanne Lahdenperä, et al., "A 365 nm UV LED-excitable antenna ligand for switchable lanthanide luminescence", Analyst, vol. 142, accepted May 3, 2017, 2411-2418 (8 pages).
Tero Soukka, et al., "Utilization of Kinetically Enhanced Monovalent Binding Affinity by Immunoassays Based on Multivalent Nanoparticle-Antibody Bioconjugates", Analytical Chemistry, vol. 73, No. 10, May 15, 2001, pp. 2254-2260 (7 pages).
Piia Von Lode, et al., "A Europium Chelate for Quantitative Point-of-Care Immunoassays Using Direct Surface Measurement", Analytical Chemistry, vol. 75, No. 13, Jul. 1, 2003, pp. 3193-3201 (9 pages).
Qi Wang, et al., "Stable and Highly Fluorescent Europium(III) Chelates for Time-Resolved Immunoassays", Inorganic Chemistry, vol. 52, No. 15, Aug. 5, 2013, pp. 8461-8466 (6 pages).
Search Report for FI Application No. 20196064 dated Jun. 18, 2020, 2 pages.
International Search Report for PCT/FI2020/050723 dated Feb. 19, 2021, 4 pages.
Written Opinion of the ISA for PCT/FI2020/050723 dated Feb. 19, 2021, 5 pages.

*Primary Examiner* — Michael G. Hartley
*Assistant Examiner* — Samantha L Mejias
(74) *Attorney, Agent, or Firm* — NIXON & VANDERHYE (57) ABSTRACT

Disclosed are novel lanthanide(III) chelates including a pyridine 4-ethynylpyrazine subunit. These chelates have an excitation wavelength which allows excitation with UV LED.

20 Claims, 7 Drawing Sheets

LUMINESCENT LANTHANIDE(III) CHELATES

CROSS-REFERENCE TO RELATED APPLICATIONS

This application is the U.S. national phase of International Application No. PCT/FI2020/050723 filed Nov. 3, 2020 which designated the U.S. and claims priority to FI Patent Application No. 20196064 filed Dec. 9, 2019, the entire contents of each of which are hereby incorporated by reference.

BACKGROUND OF THE INVENTION

Field of the Invention

The present invention relates to luminescent lanthanide (III) chelates for labeling of biomolecules, in particular to chelates comprising a 2-(pyridin-4-ylethynyl)pyrazine subunit. The invention relates also to bioaffinity assay methods and time-resolved fluorescence assay methods using the chelates of the present invention.

Description of the Related Art

The use of long life-time emitting lanthanide(III) chelate labels or probes together with time-resolved fluorometry in detection provides a method to generate sensitive bioaffinity assays. Indeed, time-resolved fluorescence based on lanthanide(III) chelates has become a successful detection technology, and it has been used in in vitro diagnostics for decades.

Stable luminescent lanthanide(III) chelates comprise a ligand with a reactive group for covalent conjugation to bioactive molecules, an aromatic structure, which absorbs the excitation energy and transfers it to the lanthanide and additional chelating groups such as carboxylic or phosphonic acid moieties and amines. Unlike organic chromophores, these molecules do not suffer from Raman scattering or concentration quenching. This allows multilabeling and development of chelates bearing several light absorbing moieties.

The measurement generally requires high-intensity pulsed UV excitation (320-340 nm) with xenon flash or nitrogen laser. Such instrumentation is expensive and large in size. For the needs of point-of-care testing, the reader device should be much smaller and cheaper. LED as a light source would allow the reader to meet these expectations. However, for technical reasons, it is not straightforward to produce high-power UV LED light below 365 nm.

Although the aromatic structures and their substituents have a significant effect on the photophysical properties of lanthanide(III) chelates, no general rules for the estimation of these effects are available. Finding a highly fluorescent chelate structure to fulfill all the requirements set for a label in respect to signal, conjugation, stability and biocompatibility as remains a challenge.

Pyridine moiety is by far the most common chromophoric subunit in luminescent lanthanide chelates. Since a single unsubstituted pyridine moiety is not efficient enough to serve as light-absorbing and triplet-sensitizing aromatic group in stable fluorescent chelates, pyridine has often been substituted with various energy absorbing groups.

Numerous lanthanide chelates disclosed in prior art comprising 4-substituted pyridine subunits have the excitation maxima only somewhat over 300 nm; a higher excitation wavelength would be desirable while developing simpler and less expensive detection instruments. The higher excitation wavelength would reduce the significance of the background luminescence signal. Furthermore, shorter wavelengths are absorbed by biological materials such as nucleic acids and aromatic amino acids.

Thus, there is still need for further luminescent lanthanide (III) chelates.

SUMMARY OF THE INVENTION

In this invention, it was observed that lanthanide(III) chelates comprising 2-(pyridin-4-ylethynyl)pyrazine subunit have an excitation wavelength which allows excitation with UV LED.

Accordingly, one aspect of the present invention is to provide lanthanide(III) chelates comprising a chromophoric moiety comprising a 2-(pyridin-4-ylethynyl)pyrazine group.

Another aspect of the present invention is to provide a biomolecule conjugated with a lanthanide(III) chelate.

Another aspect of the present invention is to provide a solid support conjugated with a lanthanide(III) chelate.

Another aspect of the present invention is to provide a non-covalent conjugate of a nanoparticle and a lanthanide chelate(III).

Another aspect of the present invention is to provide a bioaffinity assay method, wherein detection is based on time-resolved florescence derived from a lanthanide(III) chelate.

Another aspect of the present invention is to provide new use of the disclosed lanthanide(III) chelates as labels in bioaffinity binding assay method.

Another aspect of the present invention is to provide new use of the disclosed lanthanide(III) chelates as donor molecules in a time-resolved fluorescence resonance energy transfer assay method.

Exemplifying and non-limiting embodiments of the invention, both as to constructions and to methods of operation, together with additional objects and advantages thereof, are best understood from the following description of specific exemplifying embodiments when read in connection with the accompanying drawings.

The verbs "to comprise" and "to include" are used in this document as open limitations that neither exclude nor require the existence of unrecited features. The features recited in the accompanied depending claims are mutually freely combinable unless otherwise explicitly stated. Furthermore, it is to be understood that the use of "a" or "an", i.e. a singular form, throughout this document does not exclude a plurality.

BRIEF DESCRIPTION OF THE DRAWINGS

FIG. 7 shows comparison of calibration curves and obtained analytical sensitivities between a chelate according to the present invention 12 (●) and two prior art europium (III) chelates 25 (▲) and 26 (■) in a troponin I immunoassay. (A): Excitation at 340 nm. Dotted vertical lines indicate the analytical detection limit (CV 10%): 10.0 ng cTnI/L for

12; 18.6 ng cTnI/L for 25; and 16.5 ng cTnI/L for 26. (B): Excitation at 365 nm. Analytical detection (CV 10%) limits: 8.0 ng cTnI/L for 12; 23.7 ng cTnI/L for 25; and 90 ng cTnI/L for 26.

DESCRIPTION OF THE PREFERRED EMBODIMENTS

Luminescent lanthanide(III) chelates of the present invention comprise a chromophoric moiety comprising one or more 2-(pyridyn-4-ylethynyl)pyrazine groups (1). The 2-(pyridyn-4-ylethynyl)pyrazine group is capable of absorbing light or energy and transferring the excitation energy to the chelated lanthanide ion, giving rise to fluorescence.

1

The lanthanide(III) chelate has to be stable in the presence of external chelators such as EDTA and relatively low pH often used in biochemical assays. Kinetic stability is also important when chelated in dilute solution. Tolerance to high temperatures is required in DNA assays comprising thermocycling. Since the chromophoric moiety does not bind the lanthanide ion strongly enough, the chelate has to have additional metal coordination sites.

When the chelate is to be attached covalently to a molecule to be detected such as a biomolecule, it must have a reactive group.

Although in many applications a reactive group could, in principle, be attached directly to the chromophoric group or to the chelating part, it is desirable, for steric reasons, to have a linker between the reactive group and the chromophoric group or chelating part, respectively.

A structure of an exemplary a lanthanide(III) chelate 2 according to the present invention is shown below

2 wherein $Chel^1$ and $Chel^2$ are same or different a chelating groups, L is a linker and A is a reactive group.

The Chelating Groups, $Chel^1$ and $Chel^2$

The stability enhancement can be obtained by addition of chelating groups such as carboxylic acid and phosphonate moieties to the chromophore. Alternatively, the stability can be enhanced by incorporating several fluorogenic ligands into one structure or by encapsuling the metal ion to the chromophoric structure forming polycyclic cage-type compounds such as cryptates and macrocyclic Schiff's bases [Hovinen et al, Bioconjugate Chem. vol 20, 2009, 404-421].

According to one embodiment, the chelating groups comprise least two carboxylic acid groups, phosphonic acid groups or esters, amides or salts of said acids, attached to the one or more 2-(pyridyn-4-ylethynyl)pyrazine groups, either directly or via a cyclic or acyclic N-containing hydrocarbon chain.

The Reactive Group A

When the chelate is to be attached covalently to a molecule to be detected such as a biomolecule, it must comprise at least one reactive group. According to one embodiment, the reactive group, A, is selected from the group consisting of isothiocyanato, bromoacetamido, iodoacetamido, maleimido, 4,6-dichloro-1,3,5-triazinyl-2-amino, pyridyldithio, thioester, aminooxy, azide, hydrazide, amino, alkynyl, a polymerizing group, and a carboxylic acid or acid halide or an active ester thereof, preferably from isothiocyanato, iodoacetamido, maleimido, and 4,6-dichloro-1,3,5-triazinyl-2-amino, more preferably isothiocyanato or 4,6-dichloro-1, 3,5-triazinyl-2-amino.

In case the chelate or chelating agent should be attached to a microparticle or nanoparticle during the manufacturing process of said particles, the reactive group is a polymerizable group, such as methacroyl group.

In the case the chelate or chelating agent is to be attached to solid supports including nanomaterials, biomolecules, and various organic molecules using copper(I) catalyzed Huisgen-Sharpless dipolar [2+3] cycloaddition reaction or strain-promoted azide-alkyne cycloaddition, the reactive group should be either azide or alkynyl.

The chelate must bear a reactive group in order to enable covalent binding of the chelate to a biomolecule or to a solid support. However, there exist applications where no such covalent binding is necessary. Chelating compounds of this invention can also be used in applications where no reactive groups in the chelate are needed. One example of this kind of technology is demonstrated e.g. in Blomberg, et al., J. Immunological Methods, 1996, 193, 199. Another example where no reactive group A is needed is the separation of eosinophilic and basophilic cells [WO2006/072668]. In this application positively and negatively charged chelates bind with negatively and positively charged cell surfaces, respectively.

Yet another example where no linker is needed is the preparation of highly luminescent beads simply by swelling chelates into the polymer [e.g. Soukka et al., Anal. Chem., 2001, 73, 2254]. An exemplary polymer is a nanoparticle.

The Linker L

Although in many applications a reactive group could, in principle, be attached directly to the chromophoric group or to the chelating part, it is desirable, for steric reasons, to have a linker between the reactive group and the chromophoric group or chelating part, respectively. The linker is especially important in case the chelate should be attached to a solid support, but it is desirable also when labeling biomolecules in solution.

According to one embodiment the linker, L, is formed from one to ten moieties, each moiety being selected from the group consisting of phenylene, alkyl containing 1-12 carbon atoms, alkylene containing 1-12 carbon atoms, ethynydiyl (—C≡C—), ethylenediyl (—C═C—), ether (—O—), thioether (—S—), amide (—CO—NH—, —CO—NR"—, —NH—CO— and —NR"—CO—), carbonyl (—CO—), ester (—COO— and —OOC—), disulfide (—SS—), sulfonamide (—SO$_2$—NH—, —SO$_2$—NR"—), sulfone (—SO$_2$—), phosphate (—O—PO$_2$—O—), diaza (—N═N—), and tertiary amine, wherein R' represents an alkyl group containing less than 5 carbon atoms or a secondary amine (—NH—). A particular linker is —NHCH$_2$Ph.

The linker can be tethered to the molecule in different ways. It can be tethered to the chelating part, to the N-containing chain joining the aromatic units together, or to an aromatic unit, preferably to the pyrazine moiety.

The Lanthanide Ion Ln(III)

The lanthanide(III) ion is selected from europium(III), samarium(III), terbium(III) or dysprosium(III), preferably from europium(III) and samarium(III), most preferably europium(III).

The Lanthanide(III) Chelate

The lanthanide(III) chelates of the present invention comprise a chromophoric moiety comprising one or more 2-(pyridyn-4-ylethynyl)pyrazine groups.

According to a particular embodiment the lanthanide(III) chelate comprises a lanthanide ion Ln$^{3+}$, a chromophoric moiety comprising the 2-(pyridin-4-ylethynyl)pyrazine subunit, and a chelating part comprising at least two carboxylic acid groups, phosphonic acid groups or esters, amides or salts of said acids, attached to the chromophoric moiety, either directly or via a cyclic or acyclic N-containing hydrocarbon chain.

According to a preferable embodiment the lanthanide(III) chelate comprises a reactive group A, tethered to the chromophoric moiety or to the chelating part either directly or via a linker L, said reactive group enabling binding of the chelate to a biomolecule or to a solid support. The reactive group A is preferably selected from a group consisting of isothiocyanato, bromoacetamido, iodoacetamido, maleimido, 4,6-dichloro-1,3,5-triazin-2-ylamino, pyridyldithio, thioester, aminooxy, azide, hydrazide, amino, alkynyl, a polymerizable group, and a carboxylic acid or acid halide or an active ester thereof, preferably from isothiocyanato, iodoacetamido, maleimido and 4,6-dichloro-1,3,5-triazin-2-ylamino, most preferably isothiocyanato.

According to a preferable embodiment the lanthanide(III) chelate comprises a linker L, and the linker is formed from one to ten moieties, each moiety being selected from the group consisting of phenylene, alkyl containing 1-12 carbon atoms, alkylene containing 1-12 carbon atoms, ethynydiyl (—C≡C—), ethylenediyl (—C═C—), ether (—O—), thioether (—S—), amide (—CO—NH—, —CO—NR'—, —NH—CO— and —NR'—CO—), carbonyl (—CO—), ester (—COO— and —OOC—), disulfide (—SS—), sulfonamide (—SO$_2$—NH—, —SO$_2$—NR'—), sulfone (—SO$_2$—), phosphate (—O—PO$_2$—O—), diaza (—N═N—), and tertiary amine, wherein R' represents an alkyl group containing less than 5 carbon atoms, preferably methyl phenylene.

Exemplary lanthanide(III) chelates according to the invention are the following structures:

-continued

Wherein L is the linker and A is the reactive group as defined above.

According to a preferable embodiment the lanthanide(III) chelate has the following formula wherein L and A are as defined above.

According to a particular embodiment, the Ln is Eu, the linker L is —NHCH$_2$Ph and the reactive group A is isothiocyanato, i.e. the lanthanide(III) chelate has the following structure.

Biomolecules

The biomolecule conjugated with a lanthanide(III) chelate according to the present invention is preferably an oligopeptide, oligonucleotide, DNA, RNA, modified oligo- or polynucleotide, such as phosphoromonothioate, phosphorodithioate, phosphoroamidate and/or sugar- or base modified oligo- or polynucleotide, protein, oligosaccharide, polysaccharide, phospholipide, PNA, LNA, antibody, aptamer, fragment of antibody, steroid, hapten, drug, receptor binding ligand and lectin. A particular biomolecule is an antibody.

Solid Support

The lanthanide(III) chelates and conjugated biomolecules according to this invention may be conjugated on a solid support. The solid support may be a particle such as a nanoparticle or microparticle, a slide, a plate or a resin. According to an exemplary embodiment a solid support comprising amino groups is allowed to react with a lanthanide(III) chelate tethered to an isothiocyanate group giving rise to a thiourea linkage.

In case the lanthanide(III) chelate has a polymerizing group as a reactive group, then the chelate may be introduced in the solid support, for example a particle, simultaneously with the preparation of the particles [Org. Biomol. Chem., 2006, 4, 1383]. When copper(I) catalyzed Huisgen-Sharpless reaction or strain-promoted azide-alkyne cycloaddition is used for derivatization, the chelate is tethered to an azide group and the solid support is derivatized with alkynes or vice versa.

The lanthanide(III) chelates according to the present invention may be attached to a solid support such as a nanoparticle or microparticle, a slide, a plate or a resin also non covalently. According to an exemplary non-limiting embodiment, the non-covalent binding can be achieved by dying a nanoparticle with a lanthanide(III) chelate of the present invention which does not include a reactive group.

Bioaffinity Assay

According to one embodiment the present invention relates to a bioaffinity binding assay, wherein detection is based on a signal derived from a chelate of the present invention. An exemplary bioaffinity assay is immunoassay. A particular immunoassay is Troponin I assay.

According to another embodiment the bioaffinity binding assay is a time-resolved fluorescence energy transfer assay wherein a chelate of the present invention is acting as a donor and a fluorophore is acting as an acceptor. An exemplary acceptor molecule is Alexa Fluor 700.

According to still further embodiment, the present invention relates to use of the chelates of the present invention as labels in bioaffinity binding assay.

According to still further embodiment, the present invention relates to use of the chelates of the present invention as donors in a time-resolved fluorescence resonance energy transfer assay.

Examples

The invention is further elucidated by the following examples.

General Procedures

All reagents and solvents used were of reagent grade. The coupling reactions were carried out in Biotage Microwave Initiator. MALDI mass spectra were recorded on a Bruker Daltonics Ultraflex II mass spectrometer. UV-visible absorption spectra were recorded on a Varian Cary 300 Bio UV-Vis Spectrophotometer. The fluorescent properties of the chelate, emission and excitation spectra, emission decay profile were recorded in Varian Cary Eclipse Fluorescence Spectrophotometer. The concentration of chelates were measured in PerkinElmer Elan DRC Plus ICP-MS. The reference chelates 24, 25 (WO 2014044916) and 26 (von Lode et al., 2003; Anal. Chem. 75:3193-3201) were synthesized according to literature procedures.

Tert-butyl (4-(((5-bromopyrazin-2-yl)amino)methyl)phenyl)carbamate (5)

A mixture of 2,5-dibromopyrazine (3; 0.55 g, 2.31 mmol), 4-(Boc-amino)benzylamine (4; 0.40 g, 1.80 mmol), N,N- diisopropylethylamine (DIPEA, 0.6 ml) and iso-propanol (4 ml) were sealed in a vial and heated in a microwave oven at 145° C. for 1 hour. The solvent and all volatiles were evaporated in vacuo, and the product was purified on a silica gel column using dichloromethane (DCM) to 1% methanol/DCM as the eluent. Yield was 0.40 g (59%). MALDI MS: $MH^+$ 379 and 381.

Tert-butyl (4-(((5-((trimethylsilyl)ethynyl)pyrazin-2-yl)amino)methyl)phenyl)carbamate (6)

Compound 5 (402 mg, 1.06 mmol) was placed in a vial. THF (9 ml) and TEA (9 ml) were added and the mixture was deaerated with argon for 2 minutes. Ethynyltrimethylsilane (0.602 ml, 416 mg, 4.24 mmol) was added and followed by adding bis(triphenylphosphine)palladium(II) dichloride $Pd(PPh_3)_2Cl_2$ (30 mg, 0.0424 mmol) and copper(I) iodide CuI (16.2 mg, 0.0848 mmol) as the catalysts. The vial was sealed, and the mixture was stirred at room temperature for 30 minutes and heated up to 60° C. for 1 hour in microwave reactor. All solvents were evaporated in vacuo and product was purified on a short silica gel column eluted with DCM to 1% MeOH/DCM. Yield was 410 mg. MALDI MS: $MH^+$ 397.

Tert-butyl (4-(((5-ethynylpyrazin-2-yl)amino)methyl)phenyl)carbamate (7)

Compound 6 was stirred in MeOH (25 ml) with potassium carbonate (anhydrous, 685 mg) for 30 minutes. The solvent was evaporated to dryness in vacuo. DCM (20 ml) was added to the residue and a clear solution was obtained by filtration. Product was purified on a silica gel column with the eluent of DCM to 2% MeOH/DCM. Yield was 302 mg (90%). MALDI MS: $MH^+$ 325.

Di-tert-butyl 2,2'-(((6-(((2-(bis(2-(tert-butoxy)-2-oxoethyl)amino)ethyl)(2-(tert-butoxy)-2-oxoethyl)amino)methyl)-4-((5-((4-((tert-butoxycarbonyl)amino)benzyl)amino)pyrazin-2-yl)ethynyl)pyridin-2-yl)methyl)azanediyl)diacetate (9)

Compound 8 synthesized as disclosed in WO 2014044916 and compound 7 were dissolved in THF (2.5 ml) and TEA (2.5 ml). The mixture was deaerated with argon for 3 minutes. $Pd(PPh_3)_2Cl_2$ (7 mg, 0.0096 mmol) and CuI (2 mg, 0.0096 mmol) were added as the catalysts. The reaction mixture was then sealed in a vial and heated in a microwave reactor at 60° C. for 60 minutes. The reaction mixture was transferred to a flask and dried in vacuo. Product was purified on a silica gel column with the eluent of ethyl acetate and petroleum ether 1:1 (+1% TEA, v/v) to ethyl acetate (+1% TEA, v/v). The yield was 167 mg (64%). MALDI MS $MH^+$ 1073.

The Europium(III) Chelate (10)

Compound 9 (167 mg, 0.156 mmol) was dissolved in TFA (2 ml) and the mixture was stirred in a water bath at 25° C. for 2 hours. All volatiles were removed in vacuo. MALDI MS $MH^+$ 693. The free ligand was dissolved in water (1.5 ml), and $EuCl_3$ solution (63.7 mg, 0.174 mmol in 1 ml water) was added and the mixture was stirred for 5 minutes. The pH was adjusted to 7.0 with 5% $NaHCO_3$ and the solution was stirred for 10 more minutes. The pH was adjusted to 9.0 with sat. $Na_2CO_3$. The precipitate was removed by centrifugation. The pH of the solution was adjusted to 7 with acetic acid. Acetone (45 ml) was added, and the mixture was shaken for 1 min. The precipitation was collected by centrifugation, washed with 50 ml acetone and dried with airflow.

The Isothiocyanato Activated Europium(III) Chelate (11)

Compound 10 was dissolved in water. Thiophosgene (24 μl, 0.31 mmol) and chloroform (1 ml) were added, and the mixture was stirred vigorously for 2 min. pH was followed and kept at 7.0 with 5% $NaHCO_3$ solution. The chloroform was removed and acetone (50 ml) was added. After vigorously shacking, the precipitate was isolated by centrifugation, washed once with acetone (50 ml) and dried by airflow and vacuum. MALDI MS: $M^-$, 881 and 883.

Preparation of the Glycine-Complex

The chelate 11 (10 mg) was allowed to react with glycine (100 mg) in aqueous solution at pH 7.5 for 4 hours. The product was purified by HPLC (column: Spelco Ascentis RP-Amide, 21.2 mm×25 cm. flow rate 8 ml/min, eluent 20 mM TEAA buffer at pH 7.0 in 2-20% acetonitrile, v/v). The fractions were collected and lyophilized to dryness.

Synthesis of the DTA Activated Europium(III) Chelate 12

Compound 10 was dissolved in water, and pH was adjusted to 9 with sat. sat. $Na_2CO_3$. Trichlrotriazine in chloroform was added and the mixture was stirred vigorously at room temperature for 10 min. Aqueous phase was separated and washed with diethyl ether. Acetone was added, and the mixture was shaken for 1 min. The precipitate was collected by centrifugation, washed with acetone and dried with air flow.

Synthesis of Compound 14

Reaction of compound 13 (Tetrahedron Lett, 46, 2005, 4387-4389) and 7 as described above for compound 6 yields compound 14.

Synthesis of Compound 15

Removal of the nosyl groups or 14 with thiophenol followed by treatment with bromoacetic acid ethyl ester gives rise to compound 15.

Synthesis of the Europium(III) Chelate 16

Removal of the protective groups from compound 15 by acid and base followed by treatment with europium(III) chloride gives rise to chelate 16.

Synthesis of the Iodoacetamido Activated Europium(III) Chelate 17.

Treatment of compound 16 with iodoacetic anhydride produces compound 17.

Synthesis of Compound 19

Reaction between tetra(tert-butyl) 2,2,2",2'''-[(4-bromopyridine-2,6-diyl)bis(methylenenitrilo)]tetrakis(acetate) 18 and compound 7 in the presence of Pd(II) and Cu(I) as described above for compound 8 yields compound 19.

Synthesis of the Europium(III) Chelate 20

Removal of the protective groups of compound 19 with TFA followed by treatment with europium(III) chloride gives rise to chelate 20.

Synthesis of Compound 22

Reaction between tetra(tert-butyl) 2,2',2",2"'-{(ethoxycarbonyl)methylimino]bis(methylene)bis(4-bromopyridine-6,2-diyl)bis(methylenenitrilo)}tetrakis(acetate) 21 which can be synthesized as disclosed in EP 1447666 and compound 7 in the presence of Pd(II) and Cu(I) as described above for compound 8 yields compound 22.

Synthesis of the Europium(III) Chelate 23

Removal of the protective groups from compound 22 by acid and base followed by treatment with europium(III) chloride gives rise to chelate 23.

Measurement of Luminescence Properties

Figure 1:
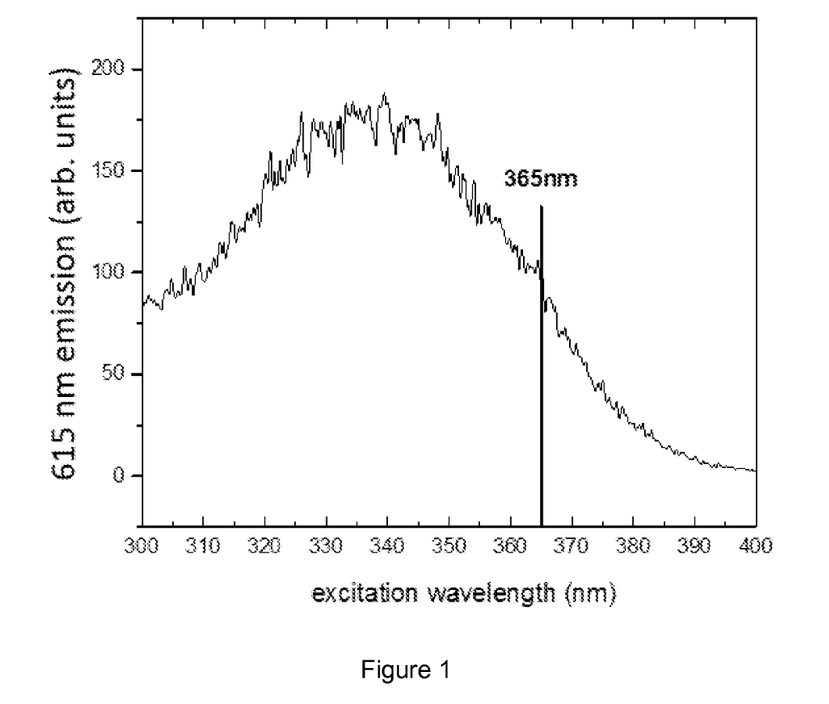
FIG. 1 shows an excitation spectrum of a state of art europium(III) chelate 24 tethered to an antibody.
Figure 2:
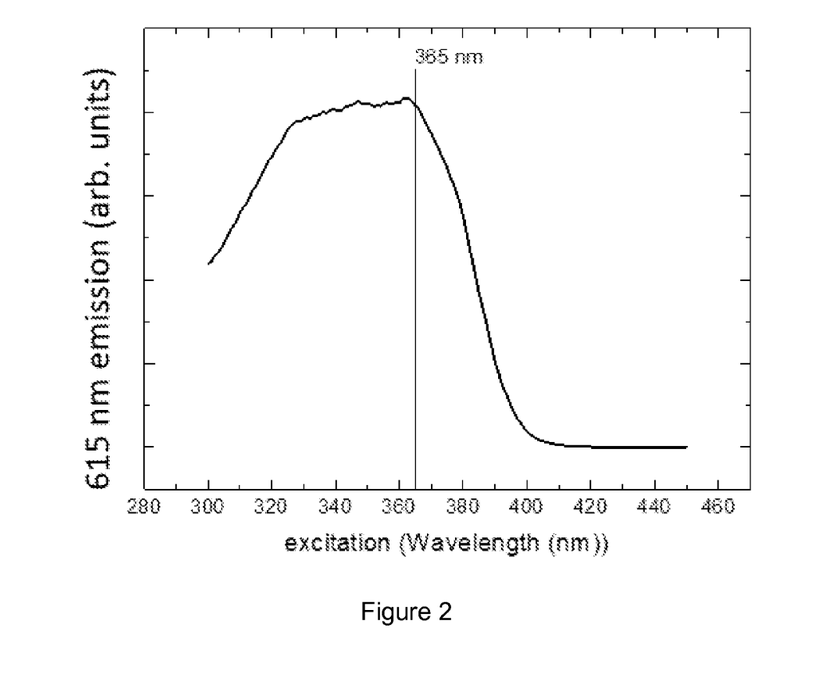
FIG. 2 shows an excitation spectrum of an exemplary europium(III) chelate 12 according to the present invention tethered to glycine.
Figure 3:
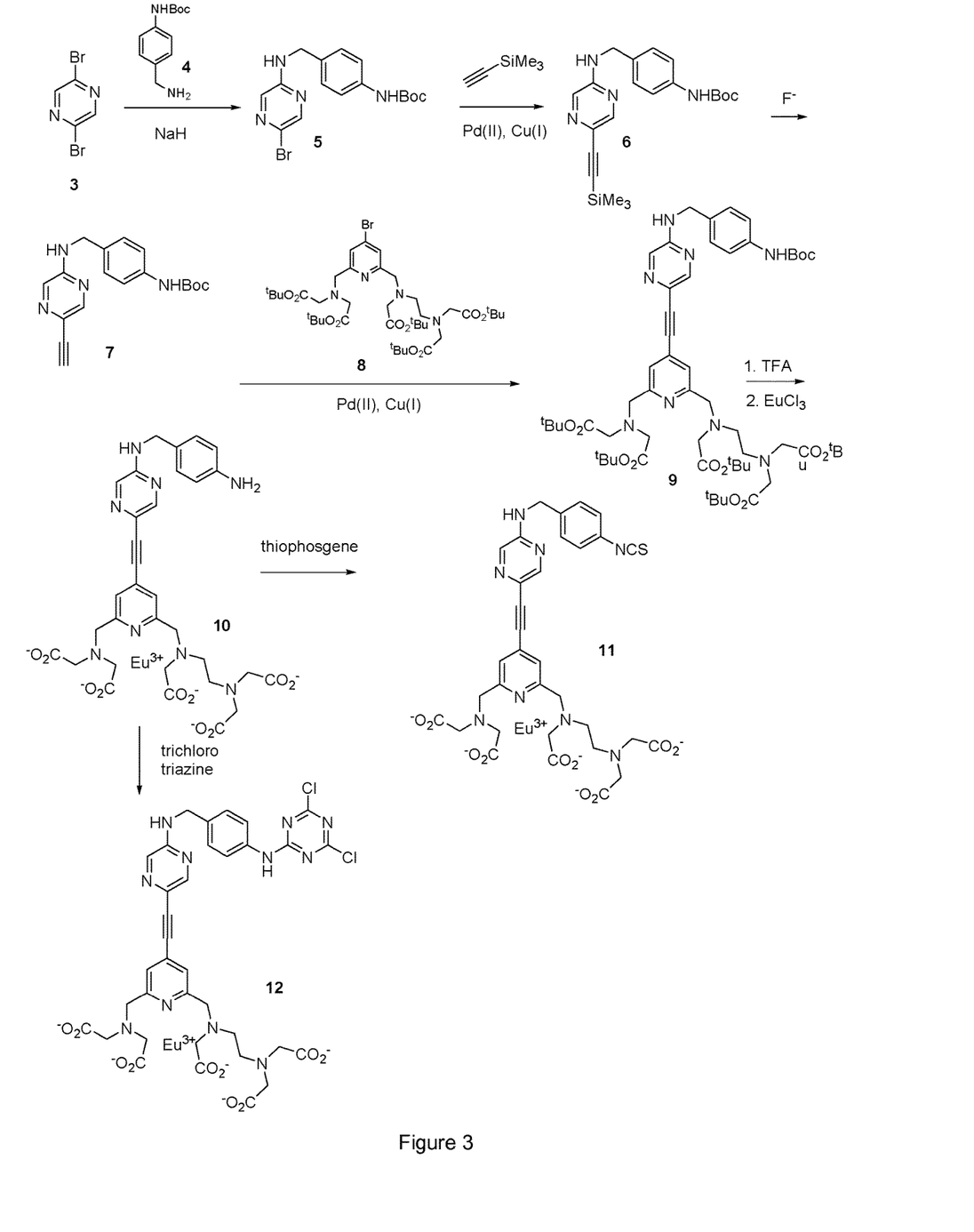
FIGS. 3-6 show synthesis routes of exemplary non-limiting europium(III) chelates according to the present invention.
Figure 4:
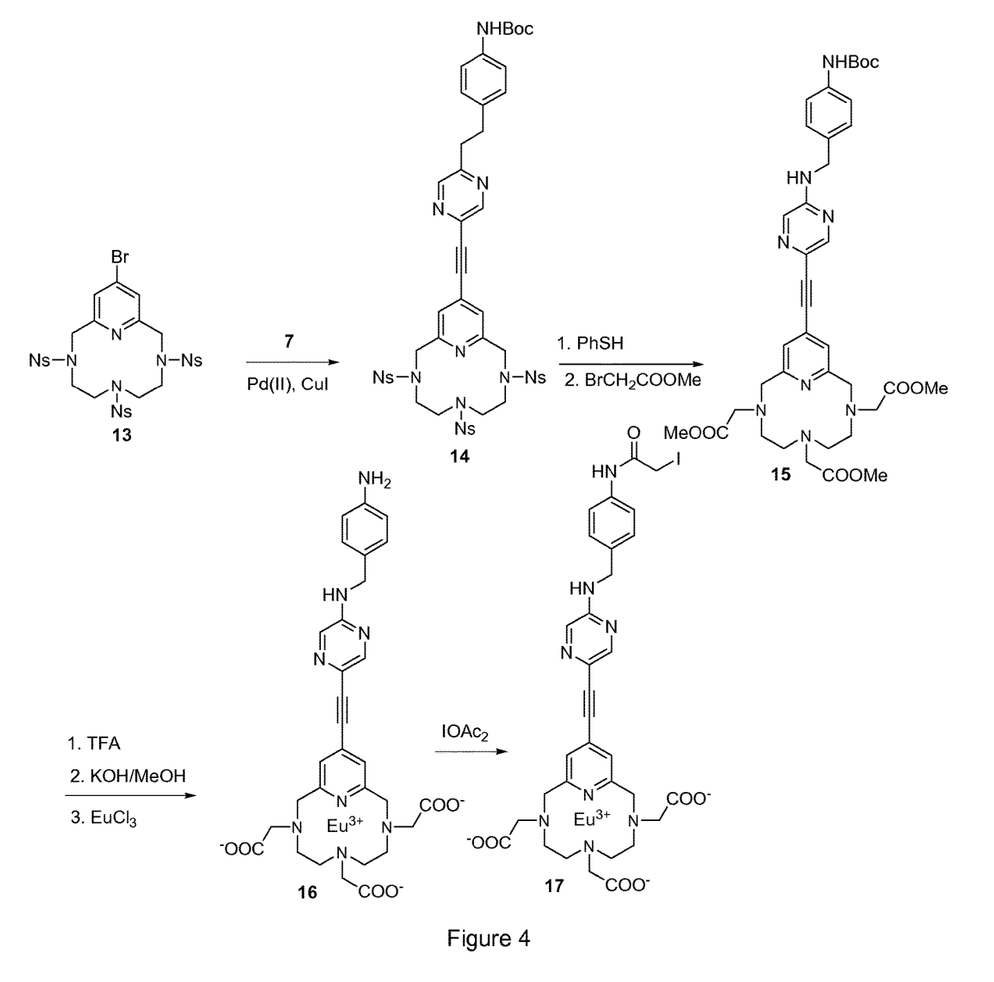
Figure 5:
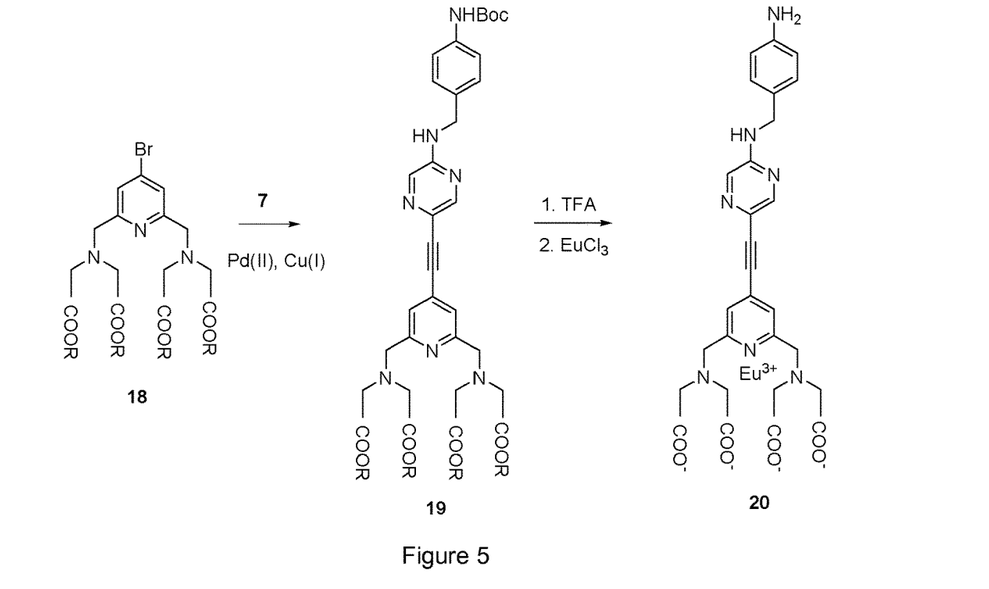

For the measurement of luminescence properties, the europium chelate 11 was coupled to the amino group of glycine in order to mimic the chelate structure change after coupled to antibody. Purification was performed on HPLC. The excitation spectrum of the chelate-glycine (FIG. 2) overlaps significantly better with the 365 nm LED emission spectrum than the excitation spectrum of the chelate according to state of art (FIG. 1). Therefore, high signal is expected in the applications utilizing 365 nm LED as the light source. The lifetime of the fluorescence emission of the chelate-glycine was 1.07 ms which is in the desired range (1-2 ms) for a good chelate for TRF-immunoassay.

Immunoassay Tests

A monoclonal mouse anti-cardiac troponin I (cTnI) tracer antibody (625-Mab, Hytest Oy, Finland) of a model Troponin I assay was labelled with the europium chelate of the present invention and two commercially utilized europium chelates in order to study how the chelate performed against the commercial chelates and whether the europium chelate of the present invention could provide an improvement to the analytical sensitivity when a simpler reader construction suitable for point-of-care testing was used.

Chelates 25 and 26 were used as reference europium (III) chelates.

Procedure

Assay: Troponin I

Capture antibodies: 19C7-Mab (Hytest Oy, Finland), 4C2-Fab (Dept of Biotechnology, University of Turku, Finland) and MF4-Fab (Dept of Biotechnology, University of Turku, Finland). The capture antibodies were biotinylated according to a routine procedure (von Lode et al 2003; Anal Chem 75:3193-3201).

Tracer antibodies: Samples of monoclonal mouse anti-cardiac troponin I (cTnI) tracer antibody 625-Mab (Hytest Oy, Finland) were labelled with following three Eu(III) chelates: 12, 25 and 26 Labelling was performed in 50 mmol/L carbonate buffer, pH 9.8. for the chelate 12 of present invention and 26, or in 50 mmol/L phosphate buffer, pH 7.2 for 25, using at least about 20-fold molar excess of the chelate as compared to the antibody. The reaction was carried out overnight a +22° C. Labeled antibodies were separated from excess free chelate on Superdex 200 HR 10/30 column (Pharmacia Biotech) using Tris-saline-azide (6.1 g/L Tris, 9.0 g/L NaCl, and 0.5 g/L NaN3), pH 7.75, as elution buffer. The fractions containing the antibody were pooled and the europium concentrations measured against a europium calibrator. The labeling degrees obtained were 7.1 for 12, 8.0 for 26 and 3.3 for 25, respectively. The antibodies were stored at +4° C.

Standard: Standard dilutions were prepared by diluting ITC complex (HyTest Oy, Finland) to end concentrations of 0, 0.005, 0.05, 0.5, 5, and 50 ng/ml in 7.5% BSA-TSA, pH 7.75.

Coating of microtiter wells with capture antibodies: 50 ng of each biotinylated capture antibody was dispensed per well (Yellow streptavidin coated microtiter well plates, Kaivogen Oy, Finland) in a total of 25 µL of Red Assay Buffer (Kaivogen Oy, Finland) and incubated for 1 hour at 22° C. with no shaking. The coated wells where washed twice with Wash Buffer (Kaivogen Oy) and immediately used for performing the immunoassays.

Immunoassay: Standard dilution or clinical lithium heparin plasma samples were dispensed 20 µl/well in 3 replicates. For background measurements, 21 replicates were prepared. Labelled tracer antibodies (100 ng/well) were added in 20 µl/well. The reactions were incubated for 30 min at +36° C., 900 rpm and then washed 6× with Wash Buffer. The wells were dried with a stream of warm air for 5 min and allowed to cool for 5 min.

Measurement was performed as described by Landenperä et al (Analyst, 2017; 142(13):2411-2418. doi: 10.1039/c7an00199a), For excitation at 340 nm, the wells were measured using Wallac PerkinElmer VictorX4 microfluorometer with emission wavelength of 615 nm, delay time 250 µs, measurement time 750 µs, cycling time 1 ms, 1000 cycles. For excitation Labrox LED excitation fluorometer was employed using emission wavelength of 615 nm, delay time 300 µs, measurement time 600 µs, cycling time 1 ms, 1000 cycles.

Figure 7:
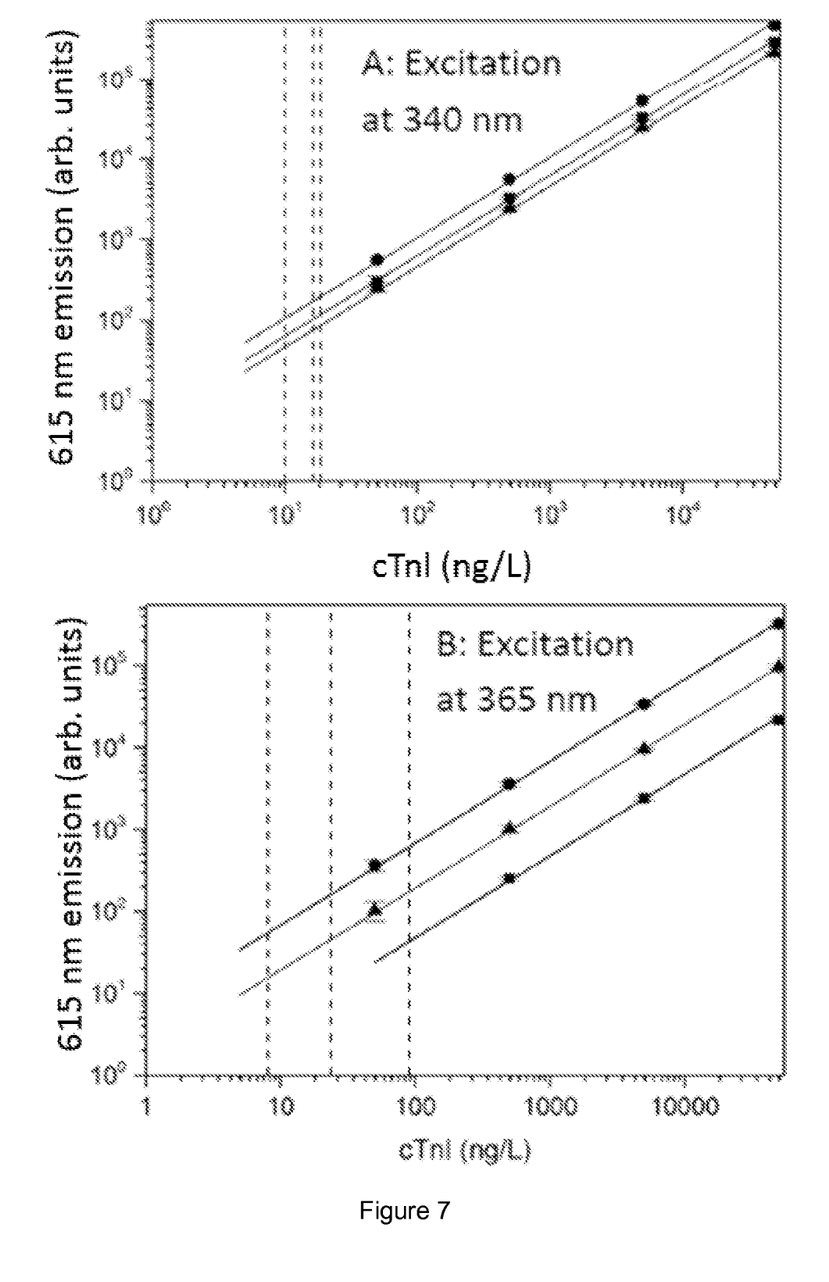

FIG. 7 shows comparison of calibration curves and obtained analytical sensitivities between a chelate according to the present invention and two commercially utilized europium(III) chelates in a troponin I immunoassay. (A): Excitation at 340 nm. Dotted vertical lines indicate the analytical detection limit (CV 10%): 10.0 ng cTnI/L for 12; 18.6 ng cTnI/L for 25; and 16.5 ng cTnI/L for 26. (B): Excitation at 365 nm. Analytical detection (CV 10%) limits: 8.0 ng cTnI/L for 12; 23.7 ng cTnI/L for 25; and 90 ng cTnI/L for 26.

Table 1 lists the analytical sensitivities obtained in cTnI immunoassay with tracer antibodies labelled with the europium chelate 12, 13 and 9-dentate-alpha-galactose.

TABLE 1

Analytical sensitivities obtained with chelate 12, chelate 25 and chelate 26 on a model Troponin I assay based on calibration curves with weighted linear fitting.

| chelate | # background replicates | Assay background | Analytical sensitivity (conc-CV 10%), ng/L |
|---|---|---|---|
| Excitation at 340 nm | | | |
| 12 | 21 | 350 | 10.0 |
| 25 | 21 | 286 | 18.6 |
| 26 | 21 | 347 | 16.5 |
| Excitation at 365 nm | | | |
| 12 | 21 | 180 | 8.0 |
| 25 | 21 | 151 | 23.7 |
| 26 | 21 | 142 | 90.0 |

Table 2 lists clinical cTnI concentrations measured in four patient samples using tracer antibodies labelled with the europium chelate 12, 25 and 26.

TABLE 2

Measured cTnI concentrations in clinical patient samples

| Chelate | Sample 1; ng/L | Sample 2; ng/L | Sample 3; ng/L | Sample 4; ng/L |
|---|---|---|---|---|
| Excitation at 340 nm | | | | |
| 12 | 16.2 | 31.7 | 44.0 | 310.9 |
| 25 | 23.5 | 44.1 | 46.0 | 369.3 |
| 26 | Not detectable | 27.0 | 43.0 | 298.8 |
| Excitation at 365 nm | | | | |
| 12 | 15.8 | 34.7 | 43.3 | 340.0 |
| 25 | 27.6 | 4.4 | 51.7 | 422.2 |
| 26 | Not detectable | Not detectable | Not detectable | 328.2 |

The europium chelate 12 produced remarkably higher specific signals than 25 or 26 while maintaining a low background signal level (FIG. 7, Table 1). The luminescence properties of the europium chelate 12 clearly outperformed the properties of the chelates 25 and 26 as the chelate 12 enabled better analytical sensitivity with the model cTnI assay in both measurement conditions (Table 1). The improvement in analytical sensitivity using the chelate 12 was clearest (3-fold compared to 25; 11-fold compared the chelate 26 when the immunoassays were measured with a simple measurement device suitable for point-of-care testing with LED-based excitation at 365 nm (Table 1). In addition, results obtained for clinical patient samples were consistent for 12 in both the measurement conditions (Table 2). All the clinical samples measured with 12 gave results clearly above the analytical detection limit in measurement both conditions, while for 25 the sample with lowest concentration (sample 1) barely exceeded the analytical detection limit when excitation at 365 nm was employed. Using 26, three of the four clinical samples gave a result below the analytical detection limit and were hence not detectable by the immunoassay when measured with excitation at 365 nm. Only 12 showed ability to provide correct results rapidly at point-of-care testing situations using simple and low-cost instrumentation for measurement.

In addition to the greatly improved luminescence properties, the europium chelate employing isothiocyanate activation should be better and more universally suitable compared to DTA-activation based chelates. While 25 appears to work fine for certain antibodies, the conditions for labelling has to be individually optimized for each antibody. In addition, some antibodies do not seem easily amenable to labelling with 25 as the more reactive DTA chemistry appears to lower the immunoreactivity of the antibody.

PCR Test

Figure 6:
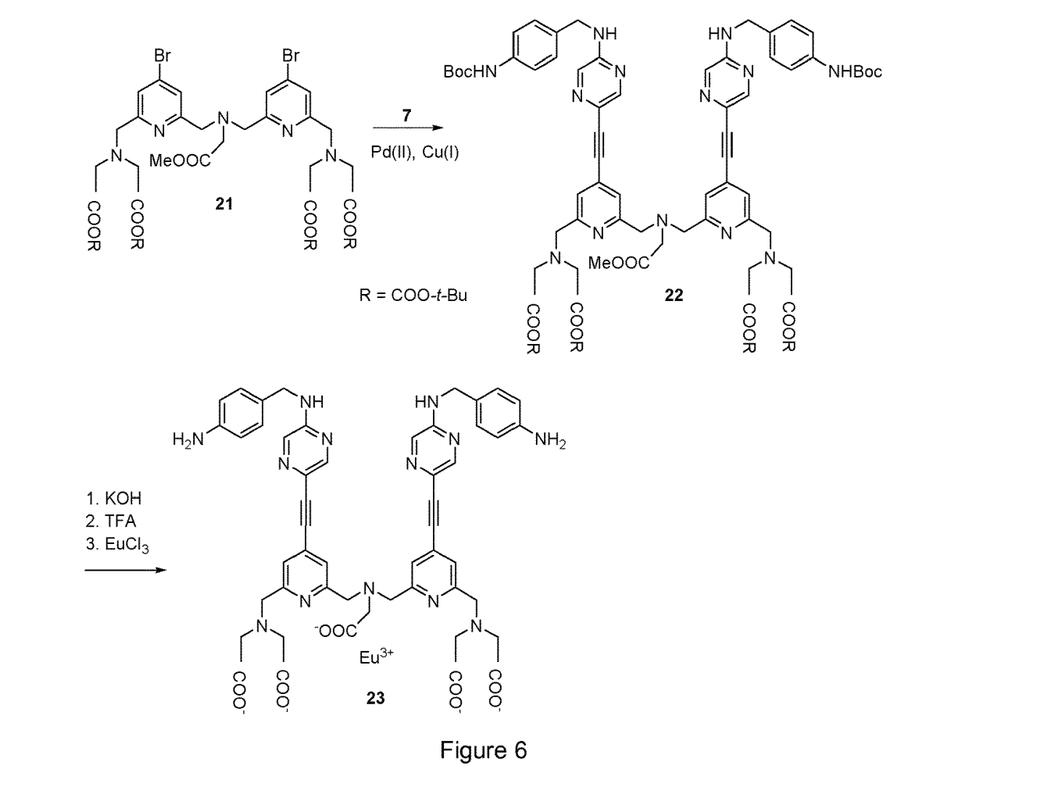

In order to demonstrate suitability of a chelate of present invention 12 in PCR, model assays using real-time PCR was done. Primer and probe sequences were adapted from Niesters, 2001 (Niesters, H. G. M, Quantitation of Viral Load Using Real-Time Amplification Techniques. METHODS 25, 419-429 (2001), FIG. 6). The probe was labelled with dabsyl at the 3'-terminus and with a europium chelate of the present invention 12 and chelate 26 at the 5'-terminus. The aim was to evaluate how the chelate 12 performed compared to the reference chelate in polymerase chain reaction in water and in more challenging sample matrices.

Probe was labelled with following Eu(III) chelates: 12 and 26. Labelling was performed in 50 mmol/L carbonate buffer, pH 9.8, for the chelate 12 of present invention and 26, using 12-16-fold molar excess of the chelate as compared to the oligonucleotide probe. The reaction was carried out overnight at +37° C. Labeled probes were first separated from excess free chelate on Illustra NICK columns (GE Healthcare) using 10 mM Tris-HCl buffer, pH 8.0, as elution buffer. Probes were the further purified with reverse phase HPLC and finally separated from traces of free chelate on Illustra NICK columns (GE Healthcare) using 10 mM Tris-HCl 50 mM KCl buffer, pH 8.3, as elution buffer. The probes were stored at −20° C.

Target: Part of Phocid Herpesvirus type 1 gB gene inserted to GeneArt Cloning Vector, (Invitrogen, Thermo Fisher Scientific) in PCR-grade water (VWR), 10 000 copies/μl.

Sample matrix: The performances of the chelates were studied both in PCR-grade water (VWR) and in stool matrix. The stool matrix was prepared by picking either 1 or 3 μl of human stool with a loop into a GenomEra Z-tube (Abacus Diagnostica Oy) and vortexing the tube for 5 minutes according to manufacturer's protocol. The liquid was then used as the base of the sample.

Test mixture: Test mixtures containing 80 nM forward primer, 100 nM reverse primer and 10 nM probe labelled with either chelate 12 or 26. With both probes a no-template-control mixture and a mixture with 1000 copies/reaction of target DNA were prepared. For the base of the sample either PCR-grade water or stool matrix was used.

Test chips: GenomEra test chips (Abacus Diagnostica) containing all necessary PCR-reagents, excluding oligonucleotides, were used for testing.

PCR assay: 35 μl of each sample (both test mixtures in pure water, 1 μl stool matrix and 3 μl stool matrix with and without the template) was pipetted into 4 replicate chips. Chips were run with GenomEra instrument using RUO *C. difficile* Bin. Tox. (cdtA) real-time PCR assay which consists of 45 cycles with temperatures ranging between +60° C. and +98° C. Fluorescence is measured every two cycles.

TABLE 3

Background (cycle 15) and endpoint (cycle 45) fluorescence of positive samples.

|  | Chelate 12 | chelate 26 |
|---|---|---|
| Background fluorescence (cts) in |  |  |
| PCR-H$_2$O | 2958 | 9177 |
| 1 μl stool matrix | 7237 | 15318 |
| 3 μl stool matrix | 7310 | 13031 |
| End-point fluorescence (cts) in |  |  |
| PCR-H$_2$O | 56833 | 64139 |
| 1 μl stool matrix | 46280 | 56631 |
| 3 μl stool matrix | 48604 | 39744 |

TABLE 4

Treshold cycles (ct) and signal-to-background ratios (S/B) of positive samples at the result cycle.

|  | Chelate 12 | chelate 26 |
|---|---|---|
| ct in |  |  |
| PCR-H$_2$O | 32.8 | 33.4 |
| 1 μl stool matrix | 33.7 | 33.8 |
| 3 μl stool matrix | 32.3 | 32.0 |
| S/B in |  |  |
| PCR-H$_2$O | 19.2 | 10.0 |
| 1 μl stool matrix | 8.1 | 4.2 |
| 3 μl stool matrix | 5.7 | 2.7 |

Figure 8:
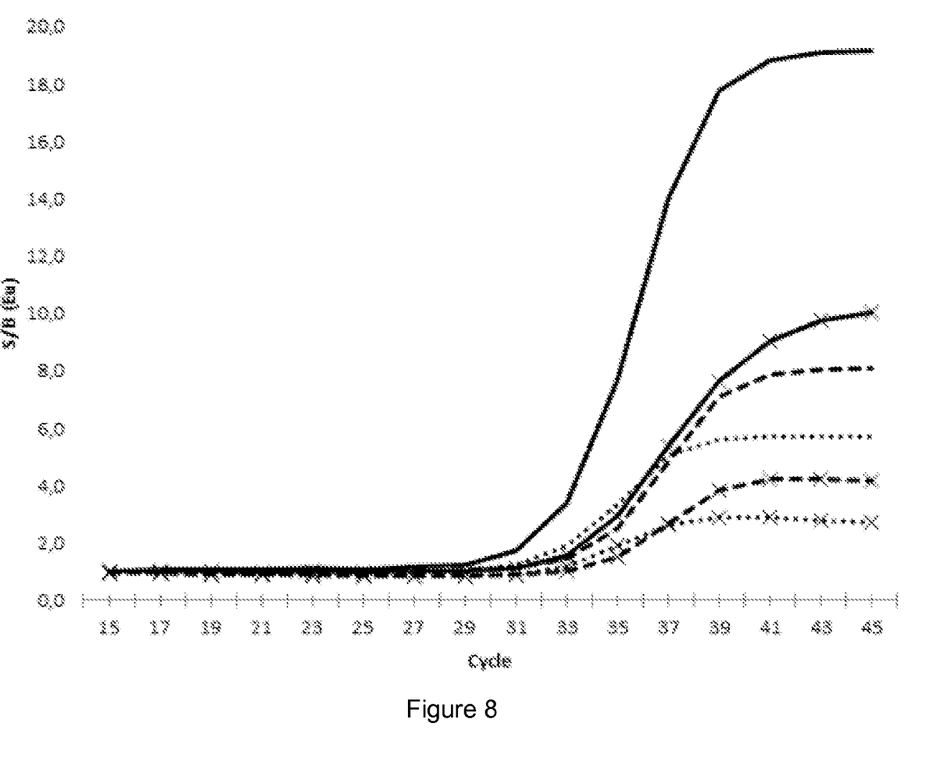
FIG. 8 shows amplification curves ($signal_{cycle(n)}/signal_{cycle15}$) of positive samples with different sample matrixes (average curve of four replicate chips). Lines without markers=chelate 12, lines with crosses=chelate 26. Continuous line: PCR-grade water, dashed line: 14 stool matrix, dotted line: 3 μL stool matrix.
Figure 9:
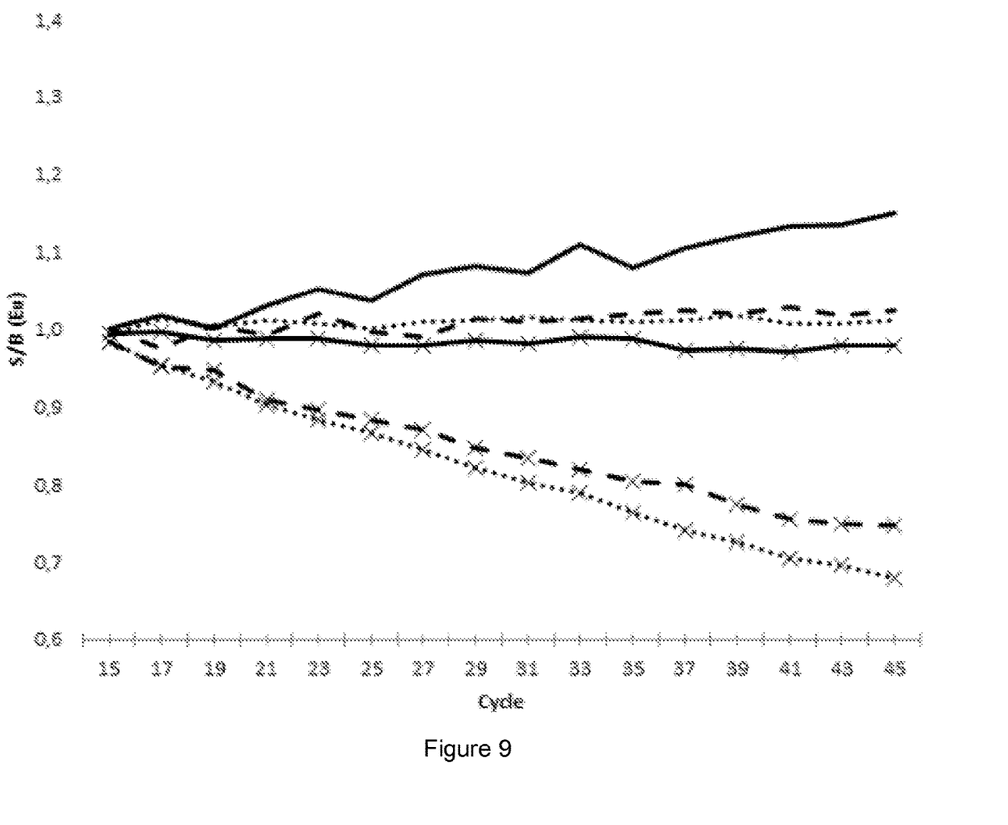
FIG. 9 shows normalized background levels ($signal_{cycle(n)}/signal_{cycle15}$) of no-template-control runs with different sample matrixes (average of four replicates). Lines without markers=chelate 12, lines with crosses=chelate 26. Continuous line: PCR-grade water, dashed line: 1 μL stool matrix, dotted line: 3 μL stool matrix.

Europium chelate 12 performed significantly better in PCR. Maximum signals or threshold cycles of chelates 12 and 26 were not distinct (table 3), but relative signals with chelate 12 in each sample matrix were approximately 2-fold compared to those of europium chelate 26 (table 4, FIG. 8). Surprisingly, fluorescence is quenched more effectively using Europium chelate 12 than the chelate 26. The excitation range in use covers optimal excitation wavelengths for both chelates but is optimized for chelate 26. Thus chelate 12 seems superior to chelate 26. No-template runs showed that the baseline signal of europium chelate 12 was not affected by different matrixes as much as europium chelate 26: a slight increase in relative signals is seen with chelate 12 in PCR-water but with more challenging matrixes signals remain in the same level throughout the run (FIG. 9). With chelate 26 signals keep the same level in PCR-water, but with more challenging matrixes a significant decrease in signals is seen which can affect the sensitivity of the assay. Furthermore, when exposed simultaneously to interfering substances and temperature stress the structure of chelate 12 is more stable compared to chelate 26.

The specific examples provided in the description given above should not be construed as limiting the scope and/or the applicability of the appended claims.

What is claimed is:

1. A lanthanide (III) chelate comprising a 2-(pyridin-4-ylethynyl) pyrazine subunit.

2. The lanthanide (III) chelate according to claim 1 comprising
a lanthanide ion Ln$^{3+}$,
a chromophoric moiety comprising the 2-(pyridin-4-ylethynyl) pyrazine subunit, and
a chelating part comprising at least two carboxylic acid groups, phosphonic acid groups or esters, amides or salts of said acids, attached to the chromophoric moiety, either directly or via a cyclic or acyclic N-containing hydrocarbon chain.

3. The lanthanide (III) chelate according to claim 1 comprising a reactive group A, tethered to the chromophoric moiety or to the chelating part either directly or via a linker L, said reactive group adapted to bind the chelate to a biomolecule or to a functional group of a solid support.

4. The lanthanide (III) chelate according to claim 3 wherein the reactive group A is selected from a group consisting of isothiocyanato, bromoacetamido, iodoacetamido, maleimido, 4,6-dichloro-1,3,5-triazin-2-ylamino, pyridyldithio, thioester, aminooxy, azide, hydrazide, amino, alkynyl, a polymerizable group, and a carboxylic acid or acid halide or an active ester thereof.

5. The lanthanide (III) chelate according to claim 3 wherein the linker L is formed from one to ten moieties, each moiety being selected from the group consisting of phenylene, alkyl containing 1-12 carbon atoms, alkylene containing 1-12 carbon atoms, ethynydiyl (—C≡C—), ethylenediyl (—C═C—), ether (—O—), thioether (—S—), amide (—CO—NH—, —CO—NR'—, —NH—CO— and —NR'—CO—), carbonyl (—CO—), ester (—COO— and —OOC—), disulfide (—SS—), sulfonamide (—SO$_2$—NH—, —SO$_2$—NR'—), sulfone (—SO$_2$—), phosphate (—O—PO$_2$—O—), diaza (—N═N—), and tertiary amine, wherein R' represents an alkyl group containing less than 5 carbon atoms, or a secondary amine (—NH).

6. The lanthanide (III) chelate according to claim 3 wherein the linker L is —NHCH$_2$Ph, wherein—is the position of the chromophoric moiety.

7. The lanthanide (III) chelate according to claim 1 selected from the group consisting of -continued and -continued wherein A is a reactive group selected from a group consisting of isothiocyanato, bromoacetamido, iodoacetamido, maleimido, 4,6-dichloro-1,3,5-triazin-2-ylamino, pyridyldithio, thioester, aminooxy, azide, hydrazide, amino, alkynyl, a polymerizable group, and a carboxylic acid or acid halide or an active ester thereof, and L is a linker formed from one to ten moieties, each moiety being selected from the group consisting of phenylene, alkyl containing 1-12 carbon atoms, alkylene containing 1-12 carbon atoms, ethynydiyl (—C≡C—), ethylenediyl (—C=C—), ether (—O—), thioether (—S—), amide (—CO—NH—, —CO—NR'—, —NH—CO— and —NR'—CO—), carbonyl (—CO—), ester (—COO— and —OOC—), disulfide (—SS—), sulfonamide (—SO₂—NH—, —SO₂—NR'—), sulfone (SO₂—), phosphate (—O—PO₂—O—), diaza (—N=N—), and tertiary amine, wherein R' represents an alkyl group containing less than 5 carbon atoms, or a secondary amine (—NH).

8. The lanthanide (III) chelate according to claim 1, wherein the lanthanide ion Ln³⁺ is selected from europium, samarium, terbium or dysprosium.

9. A biomolecule conjugated with a lanthanide (III) chelate according to claim 1.

10. The biomolecule according to claim 8 selected from oligopeptide, oligonucleotide, DNA, RNA, modified oligo- or polynucleotide.

11. A solid support conjugated with a lanthanide (III) chelate according to claim 1.

12. The solid support according to claim 11 selected from nanoparticle or microparticle, a slide, a plate or a resin.

13. A non-covalent conjugate of a nanoparticle and a lanthanide (III) chelate according to claim 1.

14. A bioaffinity binding assay method wherein detection is based on time-resolved fluorescence derived from lanthanide (III) chelate according to claim 1.

15. A bioaffinity assay method comprising applying the lanthanide (III) chelate according to claim 1 as a label.

16. A time-resolved fluorescence resonance energy transfer assay method comprising applying the lanthanide (III) chelate according to claim 1 as a donor molecule.

17. The lanthanide (III) chelate according to claim 3 wherein the reactive group A is selected from a group consisting of isothiocyanato, iodoacetamido, maleimido and 4,6-dichloro-1,3,5-triazin-2-ylamino.

18. The lanthanide (III) chelate according to claim 7 selected from the group consisting of 19. The lanthanide (III) chelate according to claim 7 is 20. The lanthanide (III) chelate according to claim 1, wherein the lanthanide ion $Ln^{3+}$ is selected from europium and samarium.

* * * * *